(12) United States Patent
Sugawara

(10) Patent No.: US 8,730,374 B2
(45) Date of Patent: May 20, 2014

(54) FOCUS DETECTION APPARATUS

(75) Inventor: Atsushi Sugawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 13/321,058

(22) PCT Filed: Jun. 9, 2010

(86) PCT No.: PCT/JP2010/060149
§ 371 (c)(1),
(2), (4) Date: Nov. 17, 2011

(87) PCT Pub. No.: WO2011/004686
PCT Pub. Date: Jan. 13, 2011

(65) Prior Publication Data
US 2012/0092545 A1    Apr. 19, 2012

(30) Foreign Application Priority Data
Jul. 7, 2009   (JP) ................................. 2009-161238

(51) Int. Cl.
*H04N 5/232*   (2006.01)
*H04N 5/76*    (2006.01)

(52) U.S. Cl.
USPC ........ 348/345; 348/231.3; 348/294; 396/104; 396/128

(58) Field of Classification Search
USPC ...................... 348/294, 345, 231.3
See application file for complete search history.

(56) References Cited

U.S. PATENT DOCUMENTS

2003/0189662 A1* 10/2003 Matsuda ................. 348/345
2005/0068428 A1*  3/2005 Uchida .................. 348/231.3
2006/0018650 A1*  1/2006 Ichimiya ................ 396/104
2007/0025716 A1*  2/2007 Ichimiya ................ 396/147
2008/0317454 A1  12/2008 Onuki
2009/0067828 A1*  3/2009 Ono et al. .............. 396/128
2013/0044246 A1*  2/2013 Shintani et al. ........ 348/294

FOREIGN PATENT DOCUMENTS

CN   101472071 A   7/2009
JP   2004-191629 A  7/2004
JP   2006-005587 A  1/2006

(Continued)

OTHER PUBLICATIONS

The above references were cited in a Apr. 23, 2013 Chinese Office Action, which is enclosed with an English Translation, that issued in Chinese Patent Application No. 201080030897.2.

*Primary Examiner* — Hung Lam
(74) *Attorney, Agent, or Firm* — Cowan, Liebowitz & Latman, P.C.

(57) ABSTRACT

An image capture apparatus includes: an image sensor including a plurality of image forming pixels that generate an image generation signal, and focus detection pixels that divide a pupil region of the imaging lens, photo-electrically convert an object image from the divided pupil region and generate a phase difference detection signal; a first focus detection unit configured to perform focus detection by using the phase difference detection signal; a second focus detection unit configured to detect an image contrast from the image generation signal from the image forming pixels and performing focus detection by a contrast detection method; and a correction value calculation unit configured to calculate a correction value for a result of focus detection by the first focus detection unit based on a difference between the result of focus detection by the first focus detection unit and a result of focus detection by the second focus detection unit.

14 Claims, 11 Drawing Sheets

(56) References Cited

FOREIGN PATENT DOCUMENTS

| | | |
|---|---|---|
| JP | 2006-146031 A | 6/2006 |
| JP | 2008-152150 A | 7/2008 |
| JP | 2008-170748 A | 7/2008 |
| JP | 2008-176114 A | 7/2008 |
| JP | 2009-003122 A | 1/2009 |
| JP | 2009-069577 A | 4/2009 |
| WO | 2009/035147 A1 | 3/2009 |

* cited by examiner

PLANAR DIAGRAM       A-A CROSS-SECTIONAL DIAGRAM

PLANAR DIAGRAM   A-A CROSS-SECTIONAL DIAGRAM

FOCUS DETECTION APPARATUS

CROSS-REFERENCE TO RELATED APPLICATIONS

This application is a national stage application of International Application No. PCT/JP2010/060149, filed Jun. 9, 2010, whose benefit is claimed and which claims the benefit of Japanese Patent Application No. 2009-161238, filed Jul. 7, 2009, the entire disclosures of which are incorporated herein by reference.

TECHNICAL FIELD

The present invention relates to an image capture apparatus that has both a first focus detection function that performs autofocus detection based on a signal from a group of focus detection pixels arranged in an image sensor and a second focus detection function that performs autofocus detection based on contrast information of a group of image forming pixels arranged in the image sensor.

BACKGROUND ART

As an autofocus detection (autofocus: AF) method for image capture apparatus, a TTL phase difference detection method used by single-lens reflex cameras is conventionally known. The TTL phase difference detection method is a method that divides part of a captured light beam in two, detects the direction and amount of shift between these two images, and thereby calculates the direction and amount of movement of the focus lens required to achieve focus at a desired focal plane (a plane conjugate to the imaging plane). In order to divide the light beam that has passed through the exit pupil of the imaging lens in two and obtain signals corresponding to the respective light beams, usually, optical path dividing means, such as a quick return mirror or a half mirror, is provided in the imaging optical path, and a focus detecting optical system and an AF sensor are provided in the rear of the optical path dividing means. In this specification, autofocus detection by the phase difference detection method that uses an AF sensor provided separate from the image sensor as described above is referred to as the "sensor-separated phase difference detection method". The sensor-separated phase difference detection method has the advantage that the focusing operation can be performed in a short time because it can directly calculate the driving direction and driving amount of the focus lens required for focusing. However, this method also has the disadvantage that because it requires a separate sensor and optical components, it is necessary to provide a relatively large space within the image capture apparatus.

On the other hand, there is another autofocus detection method in which a pupil division function that can detect the amounts of image shifts in the horizontal and vertical directions is assigned to some of the pixels of the image sensor to enable so-called phase difference AF. In this specification, this method is referred to as the "sensor-integrated phase difference detection method". The sensor-integrated focus detection method, the details of which will be described later, has the problem in that the exit pupil is vignetted depending on the aperture of the imaging lens, as a result of which accurate focus detection is not possible. To address this, Japanese Patent Laid-Open No. 2004-191629 discloses a technique that enables more precise focus detection by performing shading correction on image signals that are used for correlation calculation of the phase difference AF by using imaging lens exit window information and focus detection region information of the lens.

However, because such a configuration requires shading data based on the imaging lens exit window information and the focus detection region information, a large capacity storage region is necessary when actual measured shading data is stored as adjustment values. In addition, even when shading correction is performed by using values calculated by simulation or the like, there is a problem in that variation between lenses due to manufacturing error cannot be absorbed.

SUMMARY OF INVENTION

The present invention has been made in view of the above-described problems, and the present invention improves the focus detection accuracy of phase difference autofocus detection based on signals from a group of focus detection pixels arranged in an image sensor.

An image capture apparatus according to the present invention includes: an image sensor including a plurality of image forming pixels that photo-electrically convert an object image formed by an imaging lens and generate an image generation signal, and focus detection pixels that are arranged discretely between the plurality of image forming pixels and that divide a pupil region of the imaging lens, photo-electrically convert an object image from the divided pupil region and generate a phase difference detection signal; a first focus detection unit configured to perform focus detection by a phase difference detection method by using the phase difference detection signal from the focus detection pixels; a second focus detection unit configured to detect an image contrast from the image generation signal from the image forming pixels and performing focus detection by a contrast detection method; and a correction value calculation unit configured to calculate a correction value for a result of focus detection by the first focus detection unit based on a difference between the result of focus detection by the first focus detection unit and a result of focus detection by the second focus detection unit.

Further features of the present invention will become apparent from the following description of exemplary embodiments with reference to the attached drawings.

DESCRIPTION OF EMBODIMENTS

Figure 1A:
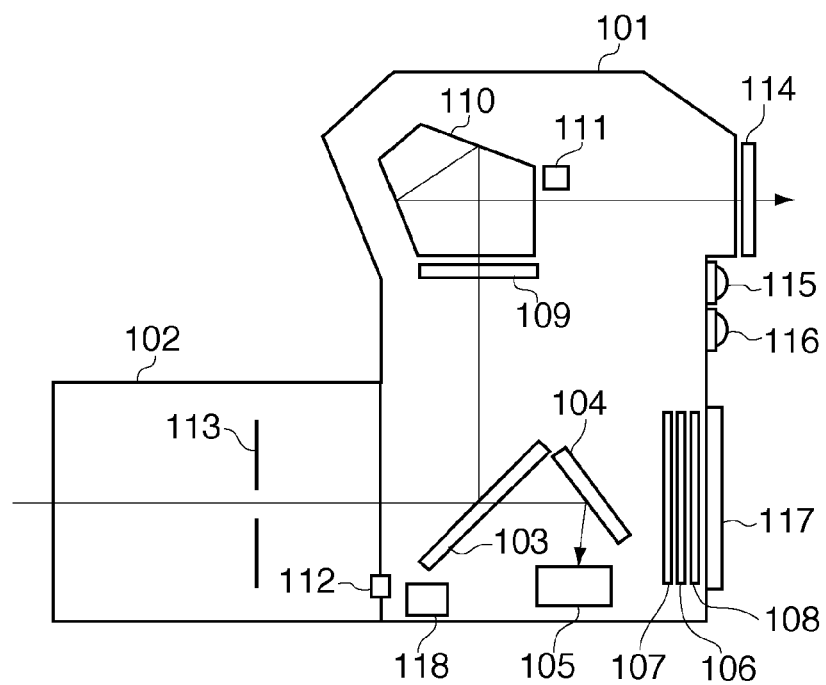
FIGS. 1A and 1B are cross-sectional views of a camera according to an embodiment of the present invention.
Figure 1B:
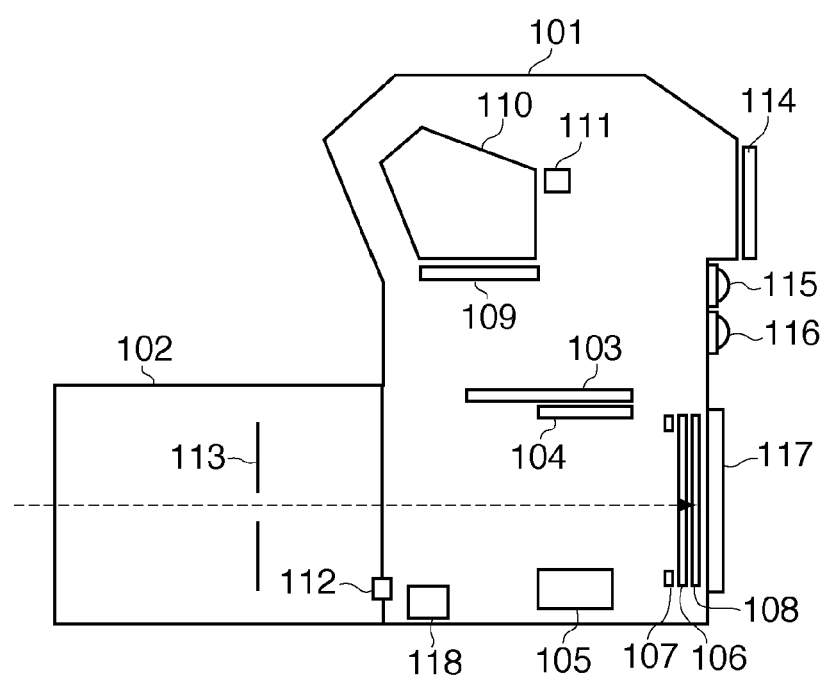

FIGS. 1A and 1B are side cross-sectional views showing a configuration of a digital single-lens reflex camera according to an embodiment of the present invention. The camera shown in FIGS. 1A and 1B has two modes: an optical viewfinder mode and a live view mode, and is capable of switching between these modes. In the optical viewfinder mode, a half mirror splits a light beam from an imaging lens, and the reflected light is guided to an optical viewfinder and an AE sensor. The user can view the subject by looking at a subject image projected onto a focusing plate through an eyepiece. The light that has passed through the half mirror is guided to an AF sensor. On the other hand, the live view mode is a mode in which the light beam from the imaging lens is guided directly to the image sensor, and image information from the image sensor is output/displayed in real time on a display apparatus provided on the back or the like of the camera such as a liquid crystal display so that the user can view the subject. Hereinafter, the configuration of the camera in these two modes will be described in detail.

FIG. 1A is a cross-sectional view of the digital single-lens reflex camera according to the present embodiment in the optical viewfinder mode. In FIG. 1A, reference numeral 101 denotes a camera body, and an imaging lens 102 is attached to the front of the camera body. The imaging lens 102 is interchangeable, and the camera body 101 and the imaging lens 102 are electrically connected via a lens mount contact group 112. Inside the imaging lens 102, a diaphragm 113 is disposed to adjust the amount of light coming into the camera. Reference numeral 103 is a main mirror, which is a half mirror. The main mirror 103 is disposed inclined on a captured light path in the viewfinder view state, and reflects the captured light beams from the imaging lens 102 to a viewfinder optical system. On the other hand, the transmitted light enters an AF unit 105 via a sub-mirror 104.

The AF unit 105 is a phase difference detection AF sensor. Because phase difference focus detection is a known technique, a description relating specific control is omitted here, but generally, it works as follows: the focus adjustment condition of the imaging lens 102 is detected by forming a secondary image plane of the imaging lens 102 on a focus detection line sensor, a focusing lens (not shown) is driven based on the result of detection, and thereby autofocus detection is performed.

Reference numeral 108 denotes an image sensor, 106 denotes a lowpass filter, and 107 denotes a focal plane shutter. Reference numeral 109 denotes a focusing plate disposed on a desired image plane of the imaging lens 102 constituting the viewfinder optical system, and 110 denotes a pentaprism for changing the viewfinder optical path. Reference numeral 114 denotes an eyepiece, and the photographer can check captured images by viewing the focusing plate 109 through the eyepiece. Reference numeral 111 denotes an AE unit, which is used for photometry.

Reference numeral 115 is a release button, which is a two-stage push switch that has a half-pressed state and a fully pressed state. By the release button 115 being half-pressed, preparatory operations for photography such as AE and AF operations are performed, and by the release button 115 being fully pressed, the image sensor 108 is exposed, and an image capturing process is performed. Hereinafter, the state in which the release button 115 is half-pressed is referred to as "SW1 is on", and the state in which the release button 115 is fully pressed is referred to as "SW2 is on". Reference numeral 116 is a live view start/end button, which is configured to switch between the optical viewfinder mode shown in FIG. 1A and the live view mode shown in FIG. 1B each time the button is pressed. Reference numeral 118 denotes a camera orientation sensor (orientation detecting sensor), which is composed of a GPS, an electronic compass, an orientation sensor and the like. With the orientation sensor 118, the position of the camera, and the camera-facing direction can be specified. By comparing an output of the orientation sensor at time t1 and an output of the orientation sensor at another time t2, the movement of the camera from t1 to t2 can be determined.

Next, FIG. 1B shows a cross-sectional view of the camera in the live view mode and during exposure. In the live view mode, the main mirror 103 and the sub-mirror 104 are withdrawn from the captured light path, and the focal plane shutter 107 opens, whereby captured light beams are guided to the image sensor 108. Reference numeral 117 denotes a display unit, which is attached on the back of the camera body 101. The display unit 117 is made up of a liquid crystal panel or the like, and is configured to be capable of displaying signals obtained from the image sensor 108 in real time to perform live view display, as well as reading and displaying images captured by the photographer.

The AF operation in the live view mode will be described now. With the camera of the present embodiment, the AF operation in the live view mode can be selected from a contrast detection method or a sensor-integrated phase difference detection method by the user switching a switch (not shown). The contrast detection method (a second focus detection method) can provide highly precise focus detection although it requires a certain amount of time to achieve focus. On the other hand, with the sensor-integrated phase difference detection method, some of the pixels on the image sensor 108 are replaced with focus detection pixels that are configured to output signal charges according to the focus state of light beams from a plurality of directions of the imaging optical system. AF operation by a phase difference detection method (a first focus detection method) is possible with the use of these pixels. The sensor-integrated phase difference detection method can provide quick focusing, which enables a focus operation that tracks a moving subject or the like. Hereinafter, image forming pixels and focus detection pixels will be described with reference to the drawings.

Figures 2A, 2B:
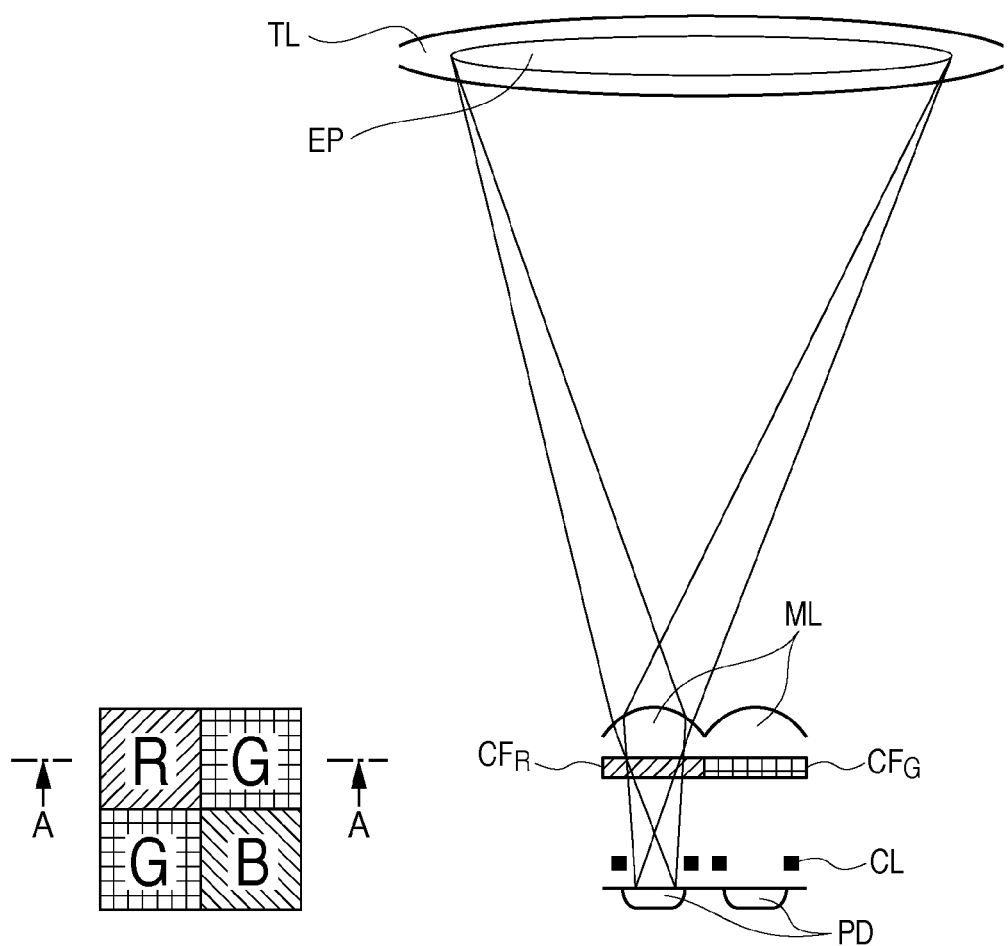
FIGS. 2A and 2B are diagrams showing a Bayer pattern image sensor and a cross section thereof.

FIG. 2A is a plan view of 2×2 image forming pixels (pixels that output image generation signals). In the present embodiment, a two-dimensional single-chip color sensor is used in which primary color filters in a Bayer pattern are formed on-chip. The Bayer pattern includes G pixels that are arranged diagonally and an R pixel and a B pixel that are arranged as the other two pixels. This 2×2 structure is repeatedly arranged. A cross section taken along the line A-A of FIG. 2A is shown in FIG. 2B. ML is an on-chip microlens arranged above each pixel. CFR is a red (R) color filter, and CFG is a green (G) color filter. PD is a schematic representation of a photoelectric conversion portion of a CMOS sensor, and CL is a wiring layer for forming signal lines that transmit various types of signals of the CMOS sensor. TL is a schematic representation of an image capture optical system. Here, the on-chip microlenses ML and the photoelectric conversion portions PD of the image forming pixels are configured to receive light beams that have passed through the image capture optical system TL as effectively as possible. In other words, an exit pupil EP of the image capture optical system TL and the photoelectric conversion portions PD are in a conjugate relationship due to the microlenses ML, and the photoelectric conversion portions are designed to have a large effective area. FIG. 2B illustrates a light beam that has entered the R pixel, but the G pixel and the blue (B) pixel also have the same structure. Accordingly, the exit pupil EP corresponding to each of the RGB pixels has a large diameter, as a result of which light beams from the subject are received efficiently and the S/N of the image signal is improved.

Figures 3A, 3B:
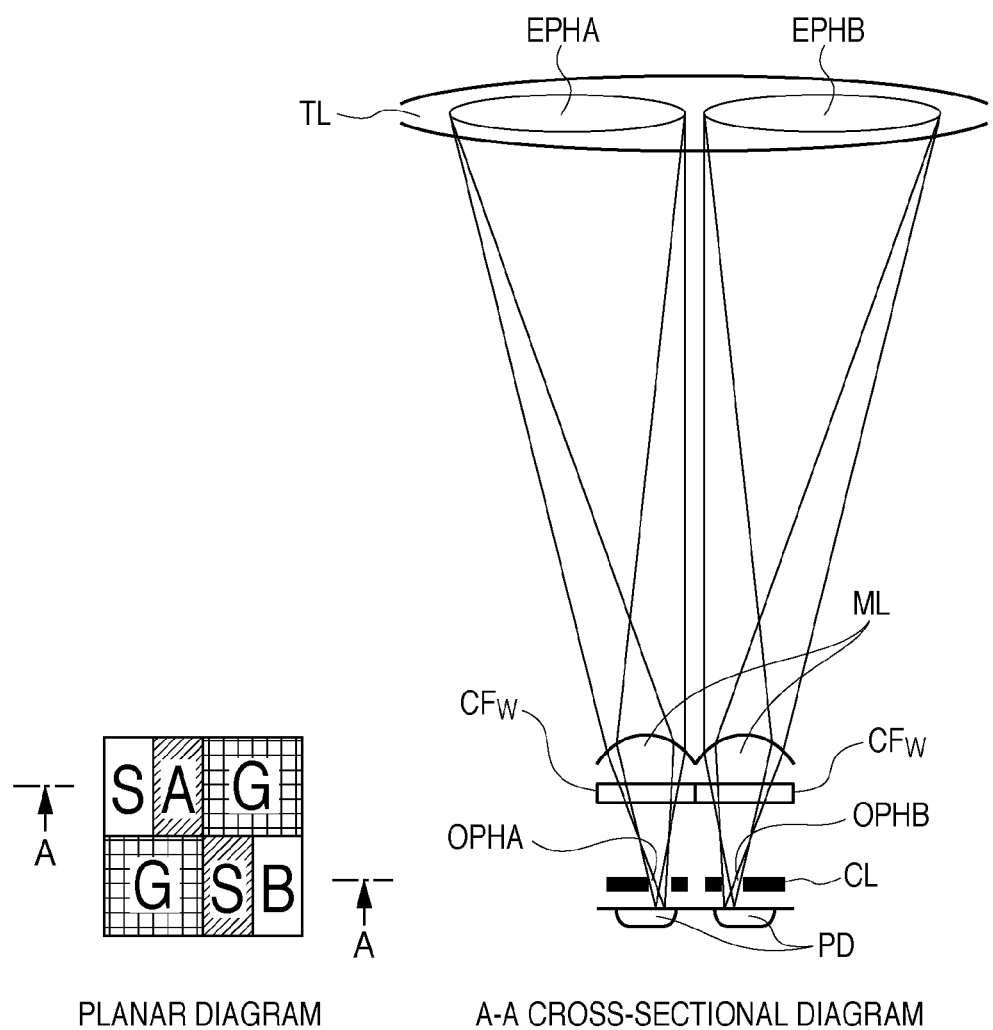
FIGS. 3A and 3B are diagrams showing an arrangement and structure of focus detection pixels for pupil division in the horizontal direction of an imaging lens.

FIGS. 3A and 3B show an arrangement and structure of focus detection pixels (pixels that output phase difference detection signals) for performing pupil division (division of the pupil region) in the horizontal direction (lateral direction) of the imaging lenses of the image sensor 108. FIG. 3A is a plan view of 2×2 pixels that include focus detection pixels. In the case of obtaining an imaging signal, G pixels serve as the primary component of luminance information. The image recognition characteristics of humans are sensitive to such luminance information, and therefore, a degradation in image quality is easily perceived if there is a deficiency of G pixels. On the other hand, R pixels and B pixels are pixels that acquire color information, but because humans are insensitive to such color information, a degradation in image quality is not easily recognized even if there is a slight deficiency of pixels that acquire color information. Accordingly, in the present embodiment, the G pixels of the 2×2 pixels are left as image forming pixels, and part of the R and B pixels is used as focus detection pixels, which are indicated by SA and SB in FIG. 3A.

A cross section taken along the line A-A of FIG. 3A is shown in FIG. 3B. The microlenses ML and the photoelectric conversion portions PD have the same structure as those of the image forming pixels shown in FIG. 2B. In the present embodiment, because signals from the focus detection pixels are not used to create images, a transparent film CFW (white) is disposed instead of a color separation color filter. In addition, in order to perform pupil division in the image sensor, openings of the wiring layer CL are displaced in a single direction from the center line of the microlenses ML. Specifically, the pixel SA and its opening OPHA have been displaced toward the right, so that the pixel SA receives a light beam that has passed through an exit pupil EPHA on the left side of the imaging lens TL. Similarly, an opening OPHB of the pixel SB has been displaced toward the left, so that the pixel SB receives a light beam that has passed through an exit pupil EPHB on the right side of the imaging lens TL. Accordingly, pixels SA are regularly arranged in the horizontal direction, and an object image acquired from this group of pixels is defined as an image A. Likewise, pixels SB are also regularly arranged in the horizontal direction, and an object image acquired from this group of pixels is defined as an image B. With such a configuration, by detecting the relative positions of the image A and the image B, it is possible to detect the amount of focus shift (defocus amount) of the object image.

In order to detect the amount of focus shift in the vertical direction (longitudinal direction), a configuration can be used in which the SA pixel and its opening OPHA are displaced upward, and the pixel SB and its opening OPHB are displaced downward. Accordingly, although not shown, the SA pixel and the SB pixel can be displaced by rotating them by 90 degrees to detect the amount of focus shift in the vertical direction.

Figure 4:
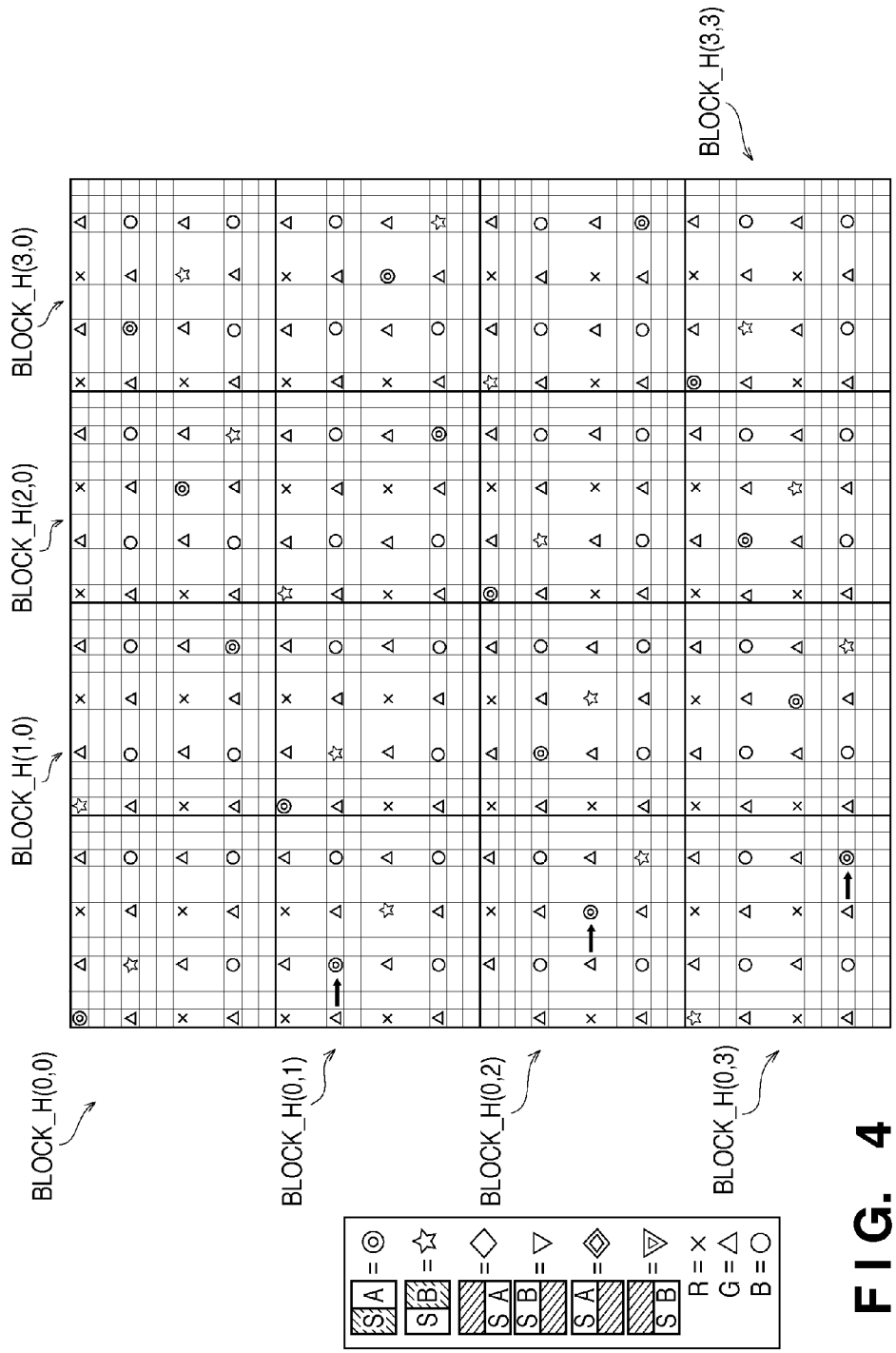
FIG. 4 is a diagram showing an example of arrangement of image forming pixels and focus detection pixels that have undergone pupil division in the horizontal direction.

FIG. 4 is a diagram showing an arrangement of image forming pixels and focus detection pixels on the image sensor 108. In the camera of the present embodiment, in order to increase the frame rate of the display unit 117 during live view, signals obtained as a result of thinning the pixels in the X (horizontal) direction to one third and thinning the pixels in the Y (vertical) direction to one third are displayed. Accordingly, the focus detection pixels are arranged according to the thinning cycle so that they can be read during thinning. In FIG. 4, G denotes a pixel to which a green filter has been applied, R denotes a pixel to which a red filter has been applied, and B denotes a pixel to which a blue filter has been applied. The G pixels, R pixels and B pixels shown in FIG. 4 are pixels that are read during thinning readout. Blank pixels without a symbol are pixels that are not read during thinning readout, but they are also arranged in the Bayer pattern, and thus are read during all pixel readout. The SA pixels shown in FIG. 4 are focus detection pixels formed by displacing the openings of the pixel portions in the horizontal direction, and serve as a standard pixel group for detecting the amount of shift with respect to images of SB pixels in the horizontal direction, which will be described later. The SB pixels are pixels that are formed by displacing the openings of the pixels in the opposite direction to the SA pixels, and serve as a reference pixel group for detecting the amount of shift with respect to images of SA pixels in the horizontal direction. The shaded portions of the SA pixels and SB pixels indicate displaced pixel openings.

As for the arrangement of the focus detection pixels, in the present embodiment, the focus detection pixels are arranged discretely with a certain spacing therebetween in the X and Y directions, in consideration of the fact that they cannot be used to form images. It is desirable to not arrange focus detection pixels in G pixel portions so as to avoid producing noticeable image degradation. In the present embodiment, a pair of an SA pixel and an SB pixel is disposed in each 4×4 pixel block (12×12 pixels in the pixel arrangement before thinning) indicated by thick black frames in FIG. 4. BLOCK_H (i, j) shown in FIG. 4 represents the name of the blocks. The blocks are configured with 4×4 blocks as one unit.

As for rules for the arrangement of the focus detection pixels, in blocks that are the same in the X direction but different in the Y direction, the arrangement of SA and SB pixels has been shifted one pixel (three pixels in the pixel arrangement before thinning) in the horizontal direction, as indicated by the arrows in FIG. 4. This is to improve the sampling properties of the group of discretely arranged focus detection pixels. In other words, because the SA and SB pixels have undergone pupil division in the X (horizontal) direction, a one-pixel shift in the X direction is performed to achieve higher sampling density. By the same token, in blocks that are the same in the Y direction but different in the X direction, the arrangement of SA and SB pixels has been shifted one pixel (three pixels in the pixel arrangement before thinning) in the vertical direction.

As just described, in the arrangement of the focus detection pixels, a cluster of 4×4 blocks is regarded as one unit, and this unit can be arranged at arbitrary positions in the image sensor as appropriate to cover the entire imaging screen. FIG. 4 shows an example in which image signals in the horizontal direction (lateral direction) are acquired for AF, but in the case of acquiring image signals in the vertical direction (longitudinal direction), a pixel arrangement as shown in FIG. 5 can be used in which the horizontal and vertical directions of FIG. 4 are transposed.

Figure 5:
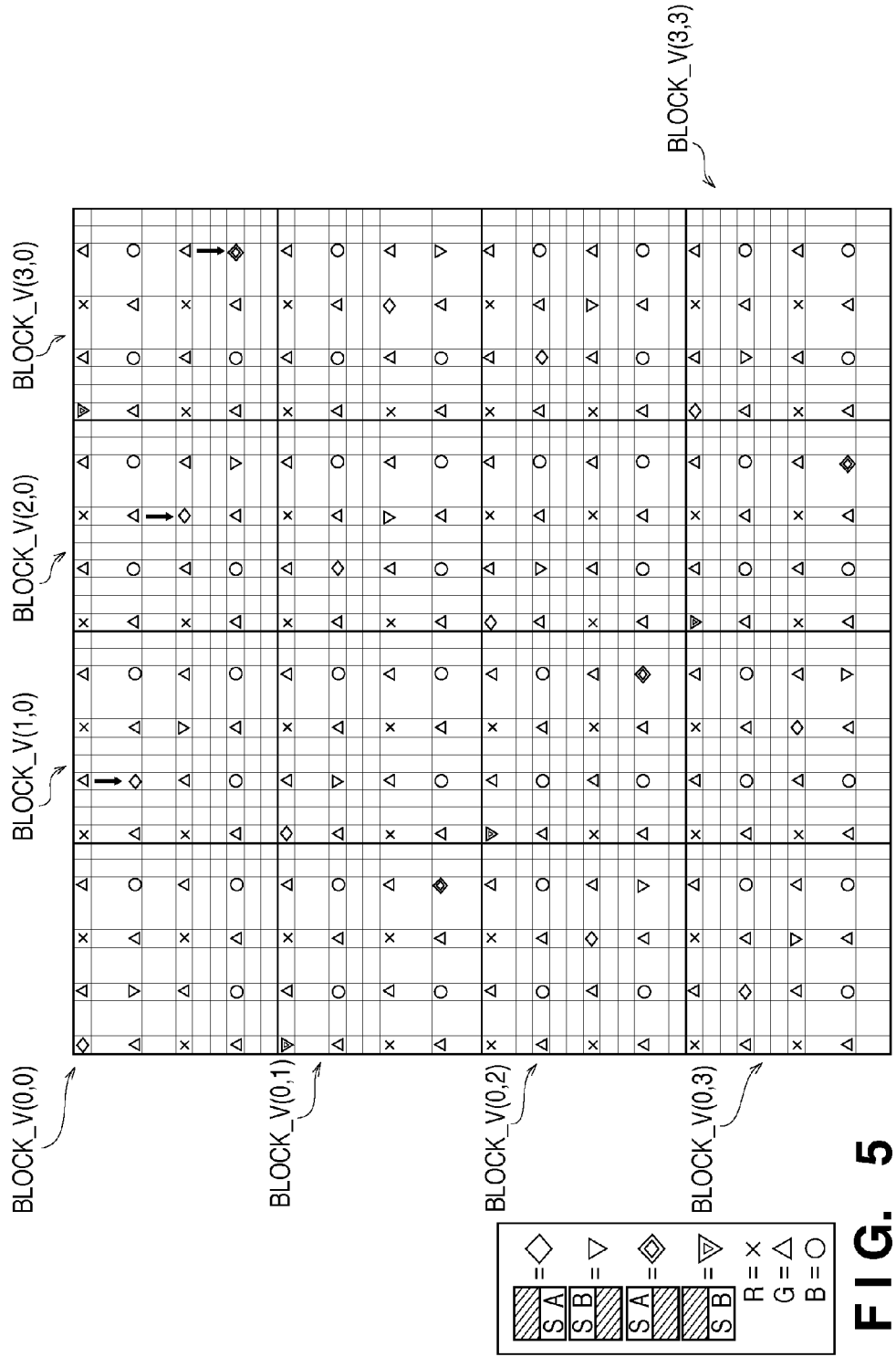
FIG. 5 is a diagram showing an example of arrangement of image forming pixels and focus detection pixels that have undergone pupil division in the vertical direction.
Figure 6:
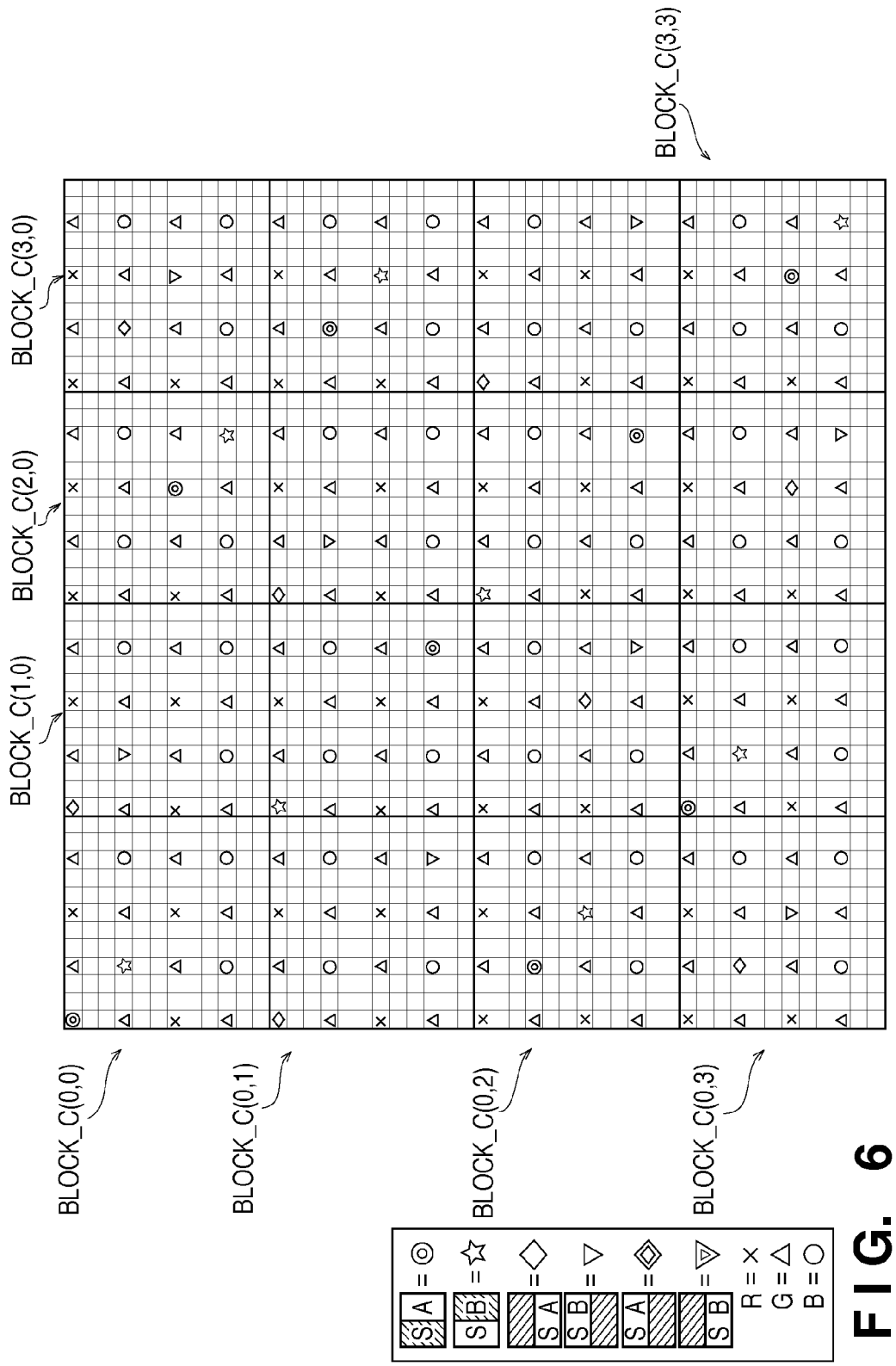
FIG. 6 is a diagram showing an arrangement of image forming pixels and focus detection pixels that have undergone pupil division in both the horizontal and vertical directions.
Figure 7:
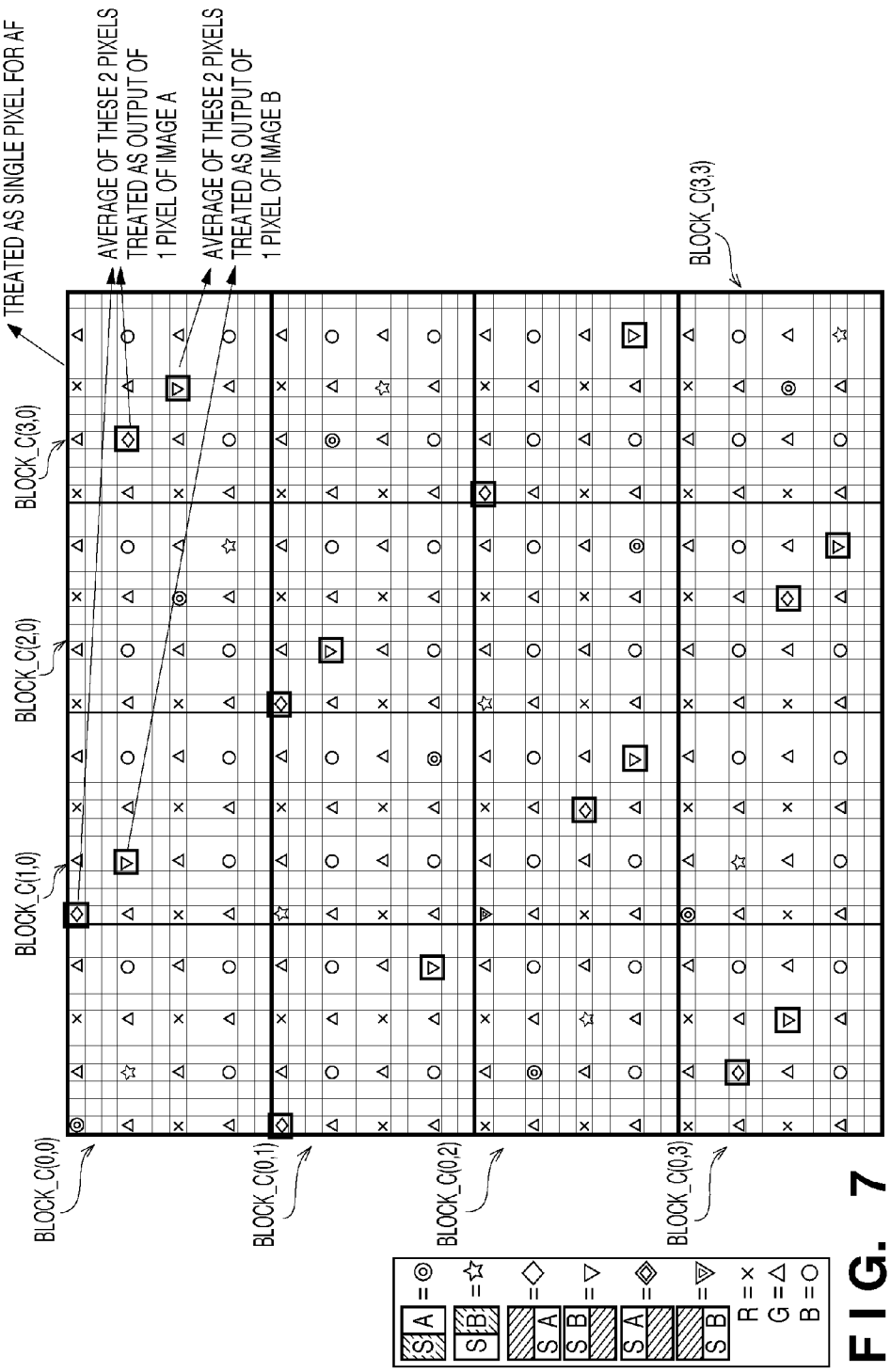
FIG. 7 is a diagram illustrating a range in which outputs of focus detection pixels are averaged.

Furthermore, FIG. 6 shows an arrangement in which focus detection pixels are disposed in an arrangement obtained by combining the arrangements of FIGS. 4 and 5 in a checker board configuration, with which AF can be performed by using signals from both the horizontal and vertical directions. This method has the advantage that an AF operation can be performed at an arbitrary position of the screen by switching the SA and SB pixels for AF computation. In the actual AF computation, as shown in FIG. 7, several SA pixels are averaged and treated as a single large pixel, improving the S/N. In the example shown in FIG. 7, two pixels are averaged for each of an image A and an image B, but the number of pixels used to calculate the average can be selected as appropriate.

In the present embodiment, the focus detection pixels of the image sensor 108 are arranged as shown in FIG. 6, whereby it is possible to achieve phase difference detection AF using both an image sensor and an AF sensor. This is referred to as "sensor-integrated phase difference detection method". With such a configuration, in the present embodiment, AF operation by the sensor-separated phase difference detection method can be performed in the optical viewfinder mode, and AF operation by the sensor-integrated phase difference detection method or the contrast detection method can be performed in the live view mode and during exposure.

The sensor-integrated phase difference detection method enables a fast focus operation, but because the focus detection pixels are defective pixels when forming actual captured images, the focus detection pixels, if densely arranged, will affect captured images. For this reason, the sampling pitch cannot be too high, and thus the sensor-integrated phase difference detection method is not good at focusing a subject that has a high spatial frequency. In addition, the exit pupils EPHA and EPHB of FIG. 3B are vignetted when the aperture of the imaging lens is reduced, so it is necessary to make corrections according to the aperture. The amount of vignetting also varies individually depending on the production errors of the cameras and lenses.

Figure 8:
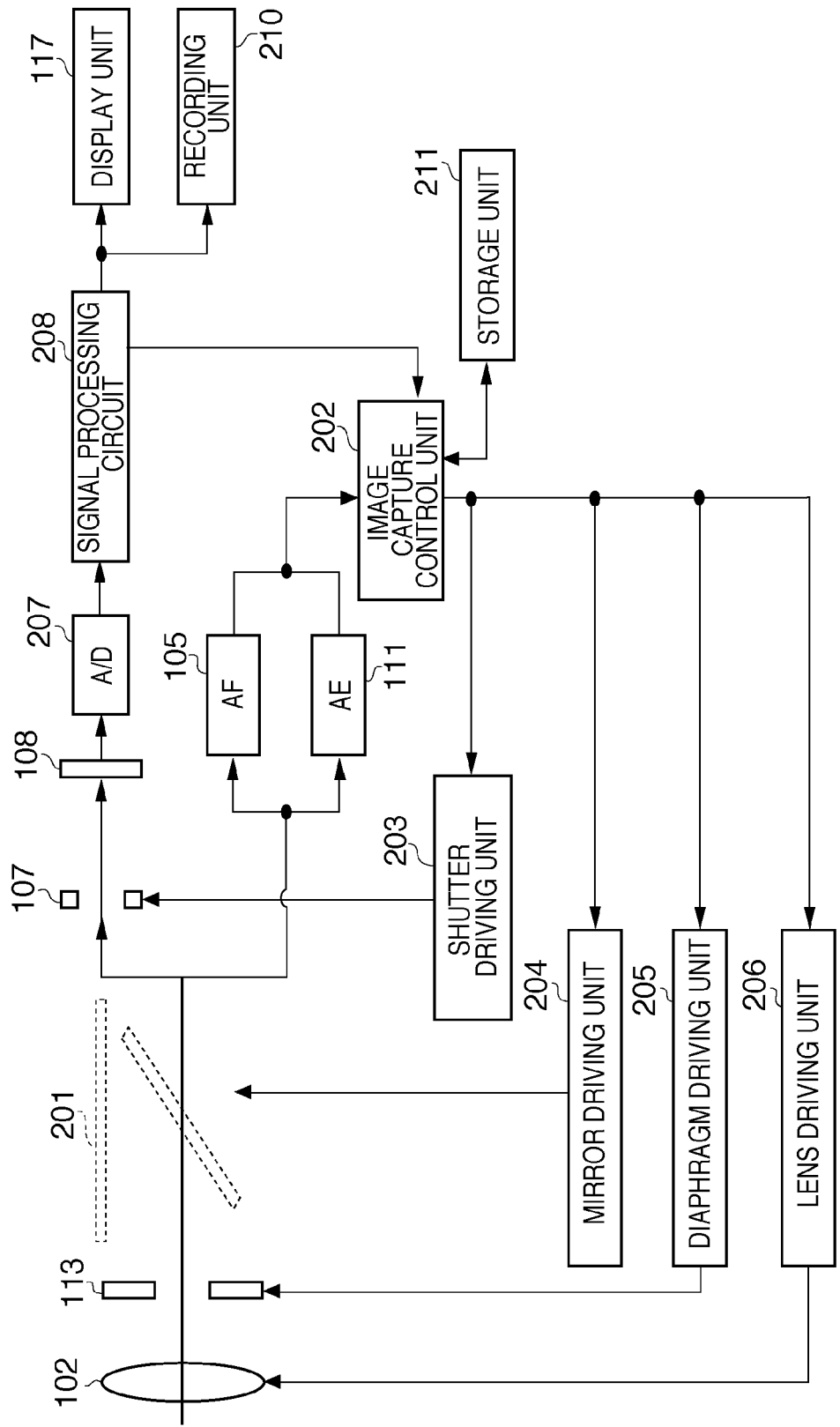
FIG. 8 is a block diagram of the camera according to an embodiment of the present invention.

A block diagram of the camera of the present embodiment will be described next. FIG. 8 shows the block diagram of the camera of the present embodiment. The same reference numerals are given to the same components as those of FIGS. 1A and 1B. In FIG. 8, light beams that have entered the imaging lens 102 pass through the diaphragm 113 and reach a mirror box 201. The mirror box 201 is composed of the main mirror 103 and the sub-mirror 104 described above, and switches between a state in which incident light is divided into transmitted light and reflected light and guided respectively to the AF unit 105 and the AE unit 111 (optical viewfinder mode: FIG. 1A) and a state in which the main mirror 103 and the sub-mirror 104 are withdrawn from the incident light path (live view mode: FIG. 1B).

In the live view mode, because the main mirror 103 and the sub-mirror 104 are withdrawn from the incident light path, and the shutter 107 is open as shown in FIG. 1B, the incident light directly reaches the image sensor 108. A video signal output from the image sensor 108 is converted to a digital signal by an A/D conversion circuit 207 and input into a signal processing circuit 208. The signal processing circuit 208 performs signal processing such as forming a luminance signal or a color signal to form a color video signal. The display unit 117 and a recording unit 210 are units that display and record/store captured images, respectively. When an image capturing process is performed, the display unit 117 and the recording unit 210 respectively display and store the color video signals formed by the signal processing circuit 208. Furthermore, the signals and information obtained by the signal processing circuit 208 are sent to an image capture control unit 202.

On the other hand, in the optical viewfinder mode (FIG. 1A) rather than the live view mode, because the light reaches the AF unit 105 and the AE unit 111, the outputs from both units are sent to the image capture control unit 202. The image capture control unit 202 drives a focusing lens (not shown) provided within the imaging lens 102 with a lens driving unit 206 based on a variety of obtained information and performs a focusing operation. The image capture control unit 202 also determines the aperture value and shutter speed during exposure, and controls a shutter driving unit 203 and a diaphragm driving unit 205. Accordingly, the imaging lens 102 is driven for focus adjustment by the lens driving unit 206, the diaphragm 113 is driven by the diaphragm driving unit 205, the mirror box 201 is driven by a mirror driving unit 204, and the shutter 107 is driven by the shutter driving unit 203. Reference numeral 211 denotes a storage unit that stores a variety of information.

Figure 9A:
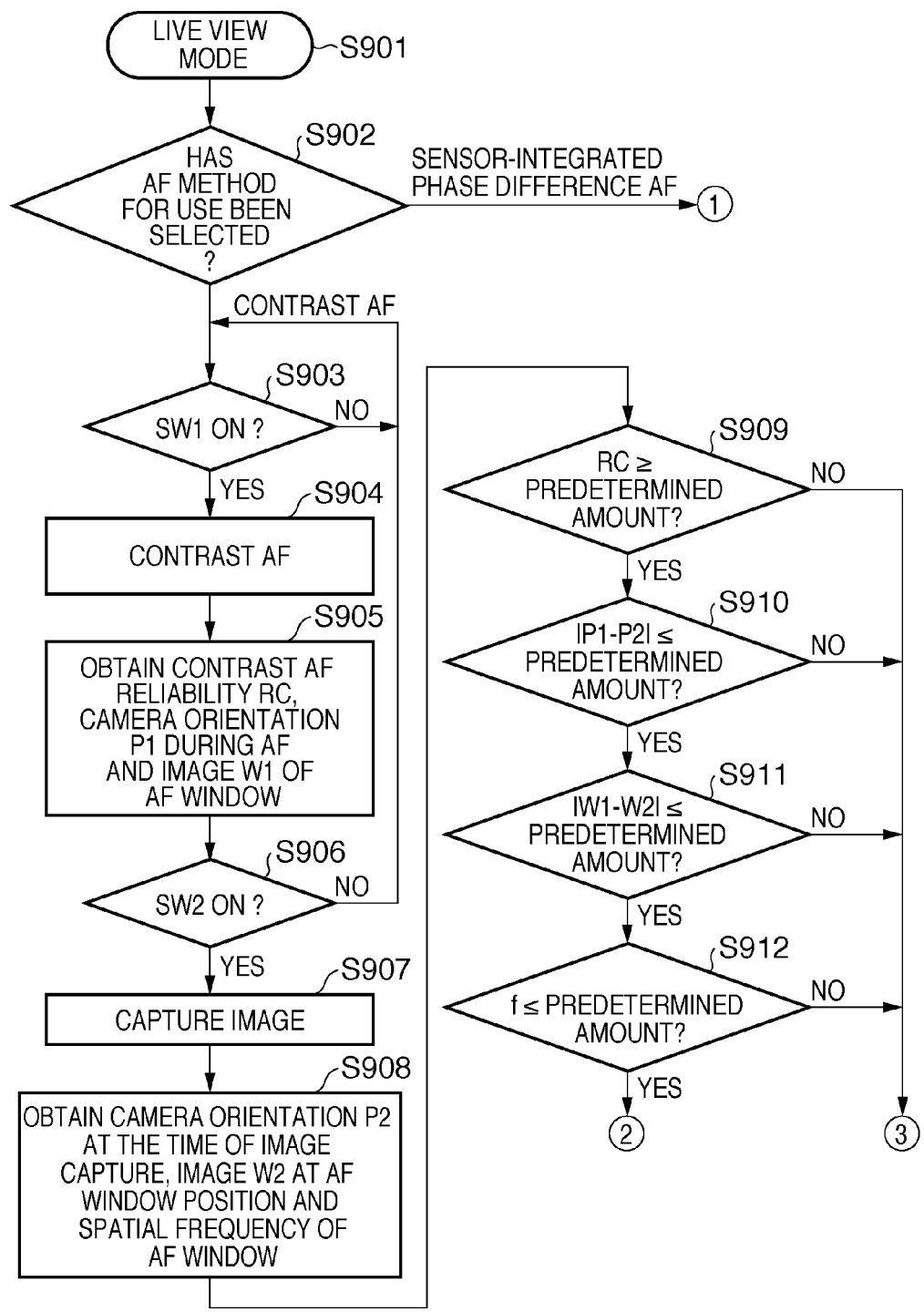
FIGS. 9A and 9B are flowcharts showing an operation of the camera according to an embodiment of the present invention.
Figure 9B:
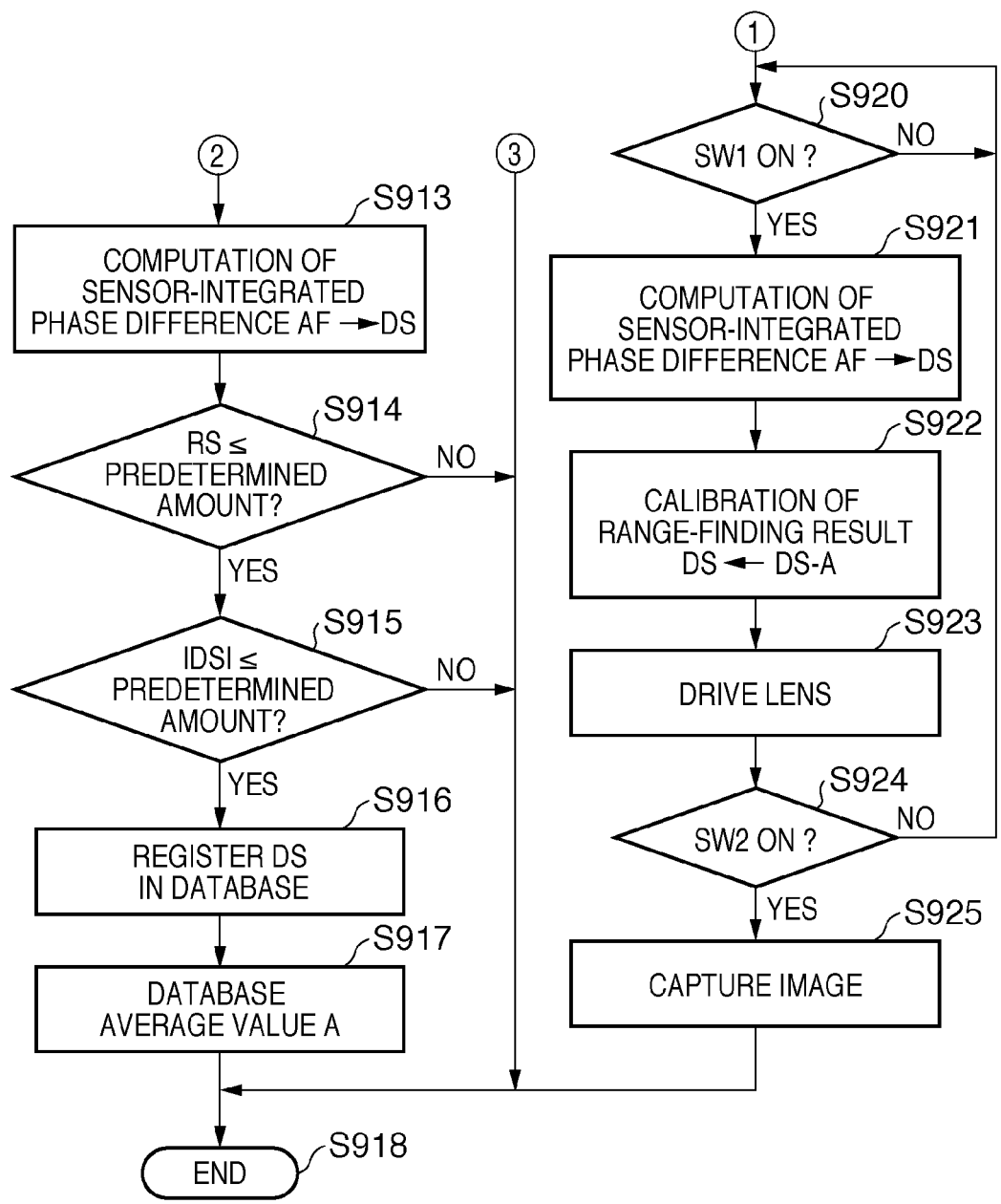

An operation of the present embodiment will be described next with reference to the flowchart shown in FIGS. 9A and 9B. In the present embodiment, the camera is assumed to be in the live view mode (Step S901). In the live view mode, first, the user selects the AF method for use between the contrast detection method and the sensor-integrated phase difference detection method, which is performed in Step S902. As already described, the contrast detection method enables highly precise focus detection, but it takes a certain amount of time to achieve focus as it requires scanning/driving of the focusing lens, whereas the sensor-integrated focus detection method has the advantage that it is capable of quick focusing. Accordingly, the user can switch between the two AF methods according to the subject to be captured. However, this is possible only when still images are captured. In the case of a camera capable of capturing both still images and moving images, it is possible to automatically switch between, for example, the contrast detection method, which is highly precise, when capturing still images and the sensor-integrated focus detection method, which is capable of tracking a moving object and fast focusing, when capturing moving images. If the contrast detection method is selected in Step S902, control advances to Step S903 where sensor-integrated phase difference calibration is performed. If the sensor-integrated phase difference AF is selected, control advances to Step S920 where AF that takes calibration values into consideration is performed.

The following first describes a flow for calculating a calibration value in the sensor-integrated phase difference detection method. Step S903 is a step in which control waits for SW1 to be turned on by the user. If SW1 is turned on, control advances to Step S904. Step S904 is a step in which AF is performed in response to the SW1 on operation by the user, whereby contrast detection AF, which is a preset AF method, is performed, and the focusing lens is driven to the focus position based on the result of the focus detection. In the contrast detection AF, a high frequency component is extracted from the video signal generated based on the signals output from the image sensor for capturing object images, the level of the high frequency component is observed at a prescribed sampling interval, and the focus lens is driven in such a direction that the level of the high frequency component shifts toward a peak. When the level of the high frequency component eventually reaches a prescribed peak range, it is determined that focus has been achieved. Such a contrast detection method has the advantage that more precise focus detection is possible for the subject because whether focus has been achieved is determined by using a video signal obtained based on the output signals from the image sensor that captures the subject. However, unlike the phase difference detection method, the contrast detection method cannot directly detect the moving direction and the moving amount of the focus lens required to achieve focus, so it has the disadvantage that the focusing operation takes long time. When the contrast detection AF operation ends, control advances to Step S905.

Figure 10:
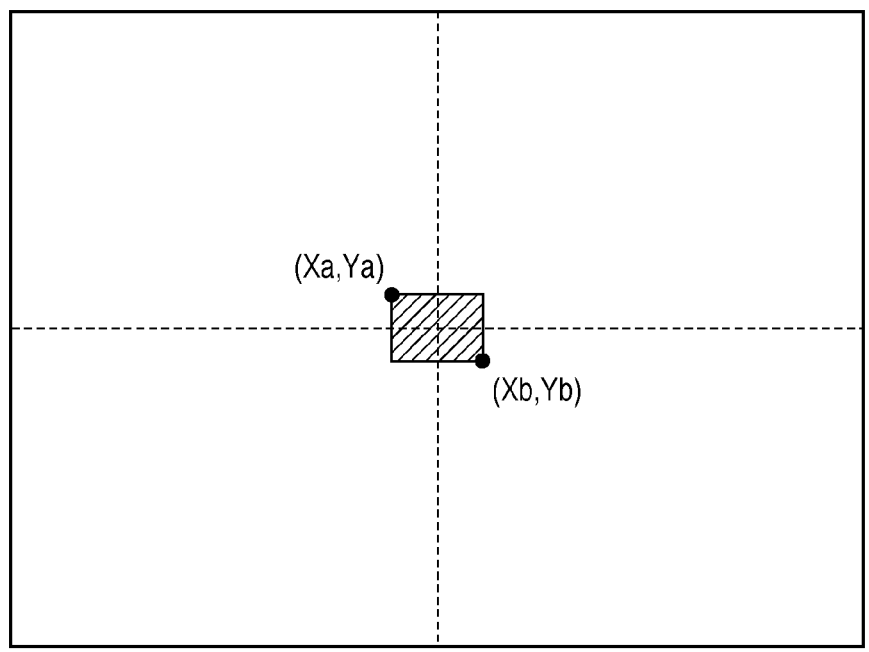
FIG. 10 is a diagram illustrating a region of an image in which contrast detection AF is performed.

Step S905 is a step that calculates and saves the orientation of the camera during contrast AF, a range of image used for contrast AF, and the reliability of contrast AF executed. First, for the orientation of the camera, an output of the orientation sensor 118 provided in the camera is referred to, and this is denoted as P1 and saved in the camera. Because contrast AF requires the calculation of the contrast of the image signal of a certain range, the range and image used are stored as W1. For example, as shown in FIG. 10, if a focus operation is performed on a region in the center of the screen, the range and image used to calculate a contrast value thereof are saved as W1. In this example, two coordinates (Xa, Ya) and (Xb, Yb) are stored, and the image signal of a rectangular region having a diagonal line connecting the two points is also stored.

Figure 11:
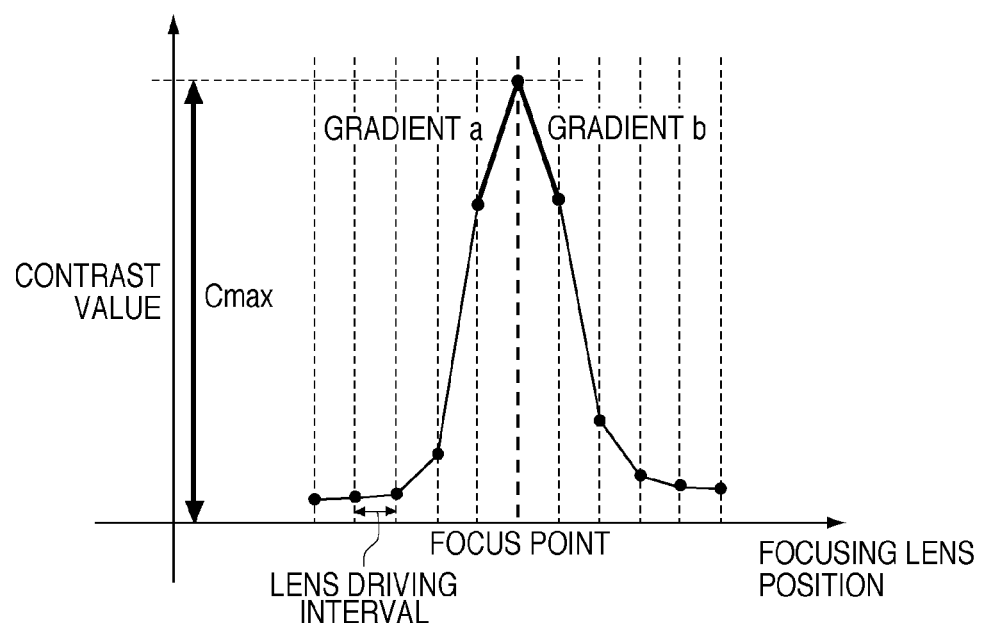
FIG. 11 is a diagram illustrating the reliability of contrast detection AF.

The reliability of contrast AF will be described with reference to FIG. 11. Contrast AF is a method in which the focusing lens is scanned, a contrast value of a target image region is calculated at each lens position, and a lens position at which the contrast value reaches a maximum value is determined as a focus point. Accordingly, the relationship between lens position and contrast value can be represented as shown in FIG. 11, for example. It is considered that the reliability increases as the absolute value of the peak contrast value increases and the gradient of the graph near the peak value becomes steep. Accordingly, Cmax that is a peak contrast value, or (a−b)÷2, an average of gradients "a" and "b" near the peak value is calculated and stored as contrast AF reliability Rc. After P1, W1 and Rc have been calculated, control advances to Step S906.

Step S906 is a step in which control waits for the release button to be pressed fully by the user, or in other words, control waits for SW2 to be turned on. If SW2 is turned on, control advances to Step S907, where an image capture operation is performed. The image sensor 108 is exposed, and the image signal output and an output of focus detection pixels are stored. In Step S908, a camera orientation P2 during image capture, an image W2 of the region (a rectangular region having a diagonal line connecting two coordinates (Xa, Ya) and (Xb, Yb) in this example) used in Step S904 for contrast AF computation, and a spatial frequency f of W2 are calculated. Generally speaking, the spatial frequency of a subject increases as the contrast value of contrast AF increases. Accordingly, in the present embodiment, the contrast value Cmax is also used as a value that has correlation with the spatial frequency f of the subject. After P2, W2 and f (=Cmax) have been calculated, control advances to Step S909.

From this step, a result of sensor-integrated phase difference detection AF (focus detection result) is determined from the output of the group of focus detection pixels stored together with the captured images, a difference with a result of contrast detection AF (focus detection result) is calculated (correction value calculation) and stored as a correction amount, and a calibration operation is performed. However, in order to accurately calculate the correction amount, both the contrast detection method and the sensor-integrated phase difference detection method need to have sufficiently high reliability. Accordingly, in Step S909, the reliability Rc of the contrast detection method is compared with a prescribed amount stored in the camera. If the reliability Rc is lower than the prescribed amount, the calibration operation is stopped. If the reliability Rc is the prescribed amount or more, control advances to Step S910.

Step S910 is a process that compares the camera orientation P1 during contrast AF and the camera orientation P2 during image capture. If P1≠P2, it indicates that the camera has moved between the time of execution of contrast AF and the time of image capture, that is, it is likely that there has been a change in the subject between the time of execution of contrast AF and the time of image capture, and the results of measurement have also changed. Accordingly, if |P1−P2| is larger than a prescribed amount, it is determined that the camera has moved, and calibration is stopped. Similarly, in Step S911, whether the same image composition has been maintained between the time of execution of contrast AF and the time of image capture is checked by using the image signal. Because the rectangular region having a diagonal line connecting the coordinates (Xa, Ya) and (Xb, Yb) stored as W1 was used for AF computation, the degree of match (similarity) between the image W1 of the rectangular region at the time of execution of contrast AF and the image W2 of the rectangular region at the time of image capture is calculated. The degree of match can be calculated by, for example, $$\sum_{x,y} |W1xy - W2xy|,$$

where the output of the coordinates (x, y) of W1 is expressed as $W1xy$ and that of W2 is expressed as $W2xy$. The smaller the difference between W1 and W2, the smaller the value. Accordingly, when the value is larger than a prescribed amount, it is likely that the subject has moved, so calibration is stopped.

Step S912 is a step that checks the spatial frequency of the region for range-finding. With the sensor-integrated phase difference detection method, focus detection pixels cannot be arranged at high density because the dense arrangement of focus detection pixels affects captured images, and as a result, the sensor-integrated phase difference detection method is not good at focusing a subject that has a high spatial frequency. Accordingly, if the spatial frequency f is higher than a prescribed amount, the calibration operation is stopped. Otherwise, control advances to Step S913.

In Step S913, a result of sensor-integrated phase difference detection AF is calculated by using the pixel output of focus detection pixels included in the captured image. As described above, focus detection pixels and ordinary pixels are mixed together in the image sensor 108, so there are portions that have a configuration different from that of ordinary pixels such as there are no color filters, and the openings have been displaced from the center of the microlenses. Accordingly, such portions cannot be used in the captured image (hereinafter referred to as the "image of interest"). In order to form the image of interest, focus detection pixel portions are regarded as damaged (defective pixels), and the damage is supplemented by using information regarding the neighboring pixels. A range-finding computation is performed by using the output of focus detection pixels, but in this case, a result of range-finding is calculated by using the output of the focus detection pixels that are present within the region that was used for contrast AF computation shown in FIG. 10. In addition, with the sensor-integrated phase difference detection method, when the aperture of the imaging lens is reduced, the exit pupil is vignetted, and thereby the shape of images A and B used for AF computation collapses. Accordingly, shading correction is performed on the images A and B and calculation is performed by simulation based on imaging lens exit window information and focus detection region information, and a defocus amount obtained at this time is denoted as Ds. After Ds has been computed, control advances to Step S914.

In Step S914, the reliability of the defocus amount Ds is calculated. If the reliability is low, calibration is stopped. Various methods have been proposed to quantify the reliability of the defocus amount Ds, but in the present embodiment, if the shapes of the image signals of the images A and B match, the reliability is determined to be high. In other words, reliability Rs can be calculated by $$Rs = \sum_{i=1}^{n} |A_i - B_i|^2,$$

where the image signals A and B obtained after AF operation by a line sensor that have n pixels in total are expressed as Ai and Bi, respectively. If the image signals of the images A and B match, Rs has a small value. Accordingly, only when Rs is a prescribed amount or less, the reliability is determined to be high, and calibration is performed. After Step S914, control advances to Step S915.

In the process up to here, whether to perform calibration is determined based on the reliability of the result of defocus computation, the spatial frequency of the subject, and the presence/absence of camera movement. However, in Step S915, the results of two types of AF: a result of sensor-integrated phase difference detection AF and a result of contrast detection AF are compared, and if the difference between them is large, the calibration operation ends. Because Ds is a difference with the AF result calculated from an image when contrast detection focus operation was performed, the ideal value of Ds is 0. Otherwise, the value of Ds itself is a value that needs to be calibrated by sensor-integrated phase difference detection method. When Ds takes a value significantly different from 0, it indicates that it is likely that there has been a change in the scene, such as the subject has moved, when range-finding is performed by both methods. In this case, accurate calibration cannot be calculated. Accordingly, in this case as well, calibration is stopped. In other words, the calibration is performed only when the absolute value of Ds is a prescribed amount or less.

Accurate focus operation can be performed by setting the final calibration amount as Ds and factoring in the final calibration amount in a result of sensor-integrated phase difference detection AF computation performed after this process. However, in the present embodiment, the final calibration amount is calculated by storing a plurality of Ds values obtained by capturing images in the storage unit 211 and using the previous Ds values stored in the storage unit 211. Accordingly, Ds is stored in the storage unit 211 provided in the camera in Step S916, and the Ds values calculated from the last n images stored in the storage unit 211 are averaged in Step S917 to obtain a calibration amount A. Here, n is any positive integer. If n=100, for example, the average value of the calibration results obtained from the last hundred images is calculated. By calculating the calibration amount by using the Ds values obtained from the last n images stored in the storage unit 211, it is possible to perform more stable calibration than when the calibration amount is determined by using only the result of a single instance of image capture. After the final calibration amount A has been determined, the sequence ends in Step S918.

In the foregoing, the calibration operation is performed on the region located in the center of the screen shown in FIG. 10, but for the regions other than the center region, calibration can be performed on any point in the screen in the same manner by storing the calibration amount for each region.

If, on the other hand, sensor-integrated phase difference detection AF is selected in Step S902, control advances to Step S920, where a focus operation that takes a calibration value A into consideration is performed. Step S920 is a step in which control waits for SW1 to be turned on by the user as in Step S903. If SW1 is turned on, a focus operation starts. In other words, in Step S921, a defocus amount Ds by sensor-integrated phase difference detection method is first computed from the output of the focus detection pixels that are present in the image sensor 108. However, there is a difference between the actual focus position and the defocus amount calculated by the sensor-integrated phase difference detection method, and the difference is a calibration amount A. Accordingly, in Step S922, the calibration amount A is subtracted from the defocus amount Ds calculated by the sensor-integrated phase difference detection method to obtain a defocus amount that takes the calibration amount into consideration. After the final defocus amount has been determined, in Step S923, the focusing lens is driven by an amount corresponding to the calculated defocus amount, and the AF operation is completed. If SW2 is turned on in Step S924, an image capture operation (Step S925) is performed, and the sequence ends.

As described above, according to the above embodiment, in the sensor-integrated phase difference detection method that performs autofocus detection by using a signal from focus detection pixels, a correction amount for correcting a result of the phase difference detection can be calculated automatically without the user having to be aware of it. It is therefore possible to constantly perform highly precise autofocus detection by the sensor-integrated phase difference detection method without requiring the user to perform complicated operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-161238, filed on Jul. 7, 2009 which is hereby incorporated by reference herein in its entirety.

The invention claimed is:

1. An image capture apparatus comprising:
an image sensor including a plurality of image forming pixels that photo-electrically convert an object image formed by an imaging lens and generate an image generation signal, and focus detection pixels that are arranged discretely between the plurality of image forming pixels and that divide a pupil region of the imaging lens, photo-electrically convert an object image from the divided pupil region and generate a phase difference detection signal;
a first focus detection unit configured to perform focus detection by a phase difference detection method by using the phase difference detection signal from the focus detection pixels;
a second focus detection unit configured to detect an image contrast from the image generation signal from the image forming pixels and performing focus detection by a contrast detection method;
an orientation detection unit configured to detect an orientation of the image capture apparatus; and
a correction value calculation unit configured to calculate a correction value for a result of focus detection by the first focus detection unit based on a difference between the result of focus detection by the first focus detection unit and a result of focus detection by the second focus detection unit, wherein the correction value calculation unit does not calculate the correction value when the orientation detection unit detects that a change in the orientation of the image capture apparatus between the time of focus detection by the second focus detection unit and the time of focus detection by the first focus detection unit is larger than a prescribed amount.

2. The image capture apparatus according to claim 1, wherein the correction value calculation unit automatically calculates the correction value each time image capture using the result of focus detection by the second focus detection unit is performed.

3. The image capture apparatus according to claim 1, wherein the first focus detection unit performs focus detection by using the phase difference detection signal from the focus detection pixels that are located in the same region as a region within a screen used in focus detection by the second focus detection unit.

4. The image capture apparatus according to claim 1, wherein the correction value calculation unit does not calculate the correction value when a reliability of the result of focus detection by the first focus detection unit or the result of focus detection by the second focus detection unit is lower than a prescribed amount.

5. The image capture apparatus according to claim 1, wherein the correction value calculation unit does not calculate the correction value when a difference between the result of focus detection by the first focus detection unit and the result of focus detection by the second focus detection unit is larger than a prescribed amount.

6. The image capture apparatus according to claim 1, further comprising a storage unit configured to store the correction value, wherein the storage unit stores the correction value each time the correction value calculation unit calculates the correction value.

7. The image capture apparatus according to claim 1, wherein the correction value calculation unit does not calculate the correction value when a spatial frequency of an image of the region within the screen used in focus detection by the second focus detection unit is higher than a prescribed amount.

8. An image capture apparatus comprising:
an image sensor including a plurality of image forming pixels that photo-electrically convert an object image formed by an imaging lens and generate an image generation signal, and focus detection pixels that are arranged discretely between the plurality of image forming pixels and that divide a pupil region of the imaging lens, photo-electrically convert an object image from the divided pupil region and generate a phase difference detection signal;

a first focus detection unit configured to perform focus detection by a phase difference detection method by using the phase difference detection signal from the focus detection pixels;

a second focus detection unit configured to detect an image contrast from the image generation signal from the image forming pixels and performing focus detection by a contrast detection method; and a correction value calculation unit configured to calculate a correction value for a result of focus detection by the first focus detection unit based on a difference between the result of focus detection by the first focus detection unit and a result of focus detection by the second focus detection unit, wherein the correction value calculation unit does not calculate the correction value when a similarity between an image signal of the region within the screen used in focus detection by the second focus detection unit and an image signal of the region within the screen used in focus detection by the first focus detection unit is smaller than a prescribed amount.

9. The image capture apparatus according to claim 8, wherein the correction value calculation unit automatically calculates the correction value each time image capture using the result of focus detection by the second focus detection unit is performed.

10. The image capture apparatus according to claim 8, wherein the first focus detection unit performs focus detection by using the phase difference detection signal from the focus detection pixels that are located in the same region as a region within a screen used in focus detection by the second focus detection unit.

11. The image capture apparatus according to claim 8, wherein the correction value calculation unit does not calculate the correction value when a reliability of the result of focus detection by the first focus detection unit or the result of focus detection by the second focus detection unit is lower than a prescribed amount.

12. The image capture apparatus according to claim 8, wherein the correction value calculation unit does not calculate the correction value when a difference between the result of focus detection by the first focus detection unit and the result of focus detection by the second focus detection unit is larger than a prescribed amount.

13. The image capture apparatus according to claim 8, further comprising a storage unit configured to store the correction value, wherein the storage unit stores the correction value each time the correction value calculation unit calculates the correction value.

14. The image capture apparatus according to claim 8, wherein the correction value calculation unit does not calculate the correction value when a spatial frequency of an image of the region within the screen used in focus detection by the second focus detection unit is higher than a prescribed amount.

* * * * *